US007477147B2

(12) United States Patent
Fitzgibbon

(10) Patent No.: US 7,477,147 B2
(45) Date of Patent: *Jan. 13, 2009

(54) SYSTEM AND METHOD FOR ACTUATING A REMOTE CONTROL ACCESS SYSTEM

(75) Inventor: James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/542,285

(22) Filed: Oct. 2, 2006

(65) Prior Publication Data

US 2007/0024418 A1 Feb. 1, 2007

Related U.S. Application Data

(63) Continuation of application No. 10/663,321, filed on Sep. 16, 2003, now Pat. No. 7,268,681.

(51) Int. Cl.
*H04Q 7/00* (2006.01)

(52) U.S. Cl. .................................................. 340/539.11

(58) Field of Classification Search ............ 340/539.11, 340/932.2, 545.1, 825.69, 825.72; 318/266; 307/10.1; 49/199
See application file for complete search history.

(56) References Cited

U.S. PATENT DOCUMENTS

| | | | | |
|---|---|---|---|---|
| 5,140,171 | A | 8/1992 | de Janasz | 307/10.8 |
| 5,680,134 | A | 10/1997 | Tsui | 341/173 |
| 5,748,101 | A | 5/1998 | Christensen et al. | 340/825.31 |
| 6,002,332 | A | 12/1999 | King | 340/545.1 |
| 6,091,330 | A | 7/2000 | Swan et al. | 340/539 |
| 6,147,597 | A * | 11/2000 | Facory | 340/425.5 |
| 6,229,276 | B1 | 5/2001 | Fitzgibbon et al. | 318/565 |
| 6,271,765 | B1 | 8/2001 | King et al. | 340/825.69 |
| 6,310,451 | B1 | 10/2001 | Fitzgibbon et al. | 618/266 |
| 6,448,894 | B1 | 9/2002 | Desai | 340/505 |
| 6,559,775 | B1 * | 5/2003 | King | 340/932.2 |
| 6,566,998 | B1 | 5/2003 | Facory | 340/425.5 |
| 2003/0029579 | A1 | 2/2003 | Mays | 160/188 |
| 2005/0057340 | A1 | 3/2005 | Fitzgibbon | 340/5.71 |

FOREIGN PATENT DOCUMENTS

EP 1 176 392 A1 1/2002

OTHER PUBLICATIONS

Search Report for British Patent Application No. GB040427.7 completed on Dec. 17, 2004.

* cited by examiner

*Primary Examiner*—Phung Nguyen
(74) *Attorney, Agent, or Firm*—Fitch, Even, Tabin & Flannery

(57) ABSTRACT

A system and method of actuating a remote control access system in a motor vehicle non-invasively detects the occurrence of an event involving an actuation of at least one component of a motor vehicle. A control signal is transmitted to a remote control access system as a result of detecting the event.

8 Claims, 4 Drawing Sheets

SYSTEM AND METHOD FOR ACTUATING A REMOTE CONTROL ACCESS SYSTEM

This is a continuation of prior application Ser. No. 10/663,321 filed Sep. 16, 2003 now U.S. Pat. No. 7,268,681, which is hereby incorporated by reference in its entirety.

FIELD OF THE INVENTION

The invention relates generally to moveable barrier operators for operating moveable barriers, such as garage doors. More specifically, the invention relates to operating these barriers based upon the occurrence of an event.

BACKGROUND OF THE INVENTION

Garage door opener systems have become more sophisticated over the years providing users with more convenience and security. In many instances, transmitters for remotely controlling the operation of moveable barriers, for example, garage doors, are placed in the vehicle of the owner and actuated by the owner when the vehicle approaches the garage. For instance, the owner may press a button or buttons on the transmitter. The transmitter then sends a signal to a receiver that is located in the garage and connected to the moveable barrier operator. Upon receiving the signal, the receiver determines if the signal is authentic. For example, the receiver may determine if the signal includes a code that matches with a code stored at the receiver. If a match is determined, an entry signal is applied to the moveable barrier operator and motors in the moveable barrier operator cause the garage door to lift, allowing the owner access to their garage.

In some circumstances, it is difficult to locate and/or use the transmitter. For example, during darkness, the transmitter may be difficult to locate in the vehicle, and, once located, difficult to operate. In other situations, distractions may occur inside and outside the vehicle making it difficult to find and operate the transmitter. For instance, noisy children, pets, or inclement weather often make it difficult to find the transmitter and press the button to open or close the garage door.

Previous systems have recognized that certain events occur within a vehicle may be used to acuate the transmitter and cause the garage door opener to be operated. For instance, headlights may be turned on or off or flashed a certain number of times to activate the transmitter. However, these known systems have required complicated rewiring in the vehicle to power the system to send a triggering event and communicate the occurrence from the source of the event to the transmitter using a wire or via some other invasive method. The use of prior systems is inconvenient because it requires a user to hard-wire an apparatus into the electrical system of the vehicle and limits triggering to electrical events. Unintentional damage may also occur if the user makes mistakes during the installation of the connection from the source to the transmitter. In addition, installation is often a time-consuming process and cannot be accomplished easily for many users.

Systems that are able to locate the position of an object with a great degree of accuracy are also well known in the art. For example, satellite locations systems exist that allow the determination of the position of an object, for instance, a vehicle. In one application, global positioning satellite (GPS) technology is used to track the operation of trucks in trucking fleets.

Previous systems that detected events within a vehicle to actuate a garage door opener have done so no matter where the vehicle was located. In other words, an occurrence of an event would always cause the transmission of a message from the transmitter, even though it would prove impossible for the receiver to receive the message. However, the actuation of the transmitter regardless of the location of the transmitter wastes the energy of the transmitter and leads to the degradation of system components due to the unnecessary actuation of these system components and may result in a receiver not recognizing a transmitted code in coding arrangements that change the code on a per actuation basis.

SUMMARY OF THE INVENTION

A system and method is provided whereby a transmitter unit detects the occurrence of an event, for example, within a vehicle. The transmitter unit may also determine whether it is in proximity to a remote control operator system. A signal is produced that actuates a moveable barrier operator system allowing a user access to an area based upon the occurrence of an event or the occurrence of an event and the determination of proximity to the remote control access system.

In one preferred approach, a transmitter unit non-invasively detects the occurrence of an event involving an actuation of at least one component of a motor vehicle. Then, the transmitter unit transmits a control signal to a remote control access system as a result of detecting the event. For example, the transmitter unit may non-invasively detect the actuation of an automotive light; actuation of a brake; motion of a window; activation of a lock; movement of a mirror; movement of a radio control; movement of a moon roof or sun roof; movement of a windshield wiper blade; actuation of a heater; setting of a cruise control.

Thus, in this approach, a method and system non-invasively detects the actuation of a motor vehicle component and a signal is sent to actuate a remote control entry system. The system is easy to install in the vehicle and does not require modifying the operation of the components of the vehicle. In another example, the transmitter unit may receive an indication of proximity of the motor vehicle to the remote control access system. In addition, an indication of an event occurrence may be non-invasively determined. Then, a control signal may be transmitted to the remote control access system indicating the detection of the event and the proximity of the motor vehicle to the remote control access system.

In still another approach, a transmitter unit receives an indication from a remote indicator source that a motor vehicle is in proximity to a remote control access system. The transmitter unit also receives an indication of the occurrence of an event involving actuation of at least one component of a motor vehicle. The event is detected and communicated to the transmitter unit. Upon detection of the proximity of the motor vehicle and the receipt of the indication of the event, a control signal is transmitted from the transmitter unit to the remote control access system.

DETAILED DESCRIPTION OF THE PREFERRED EMBODIMENTS

Figure 1:
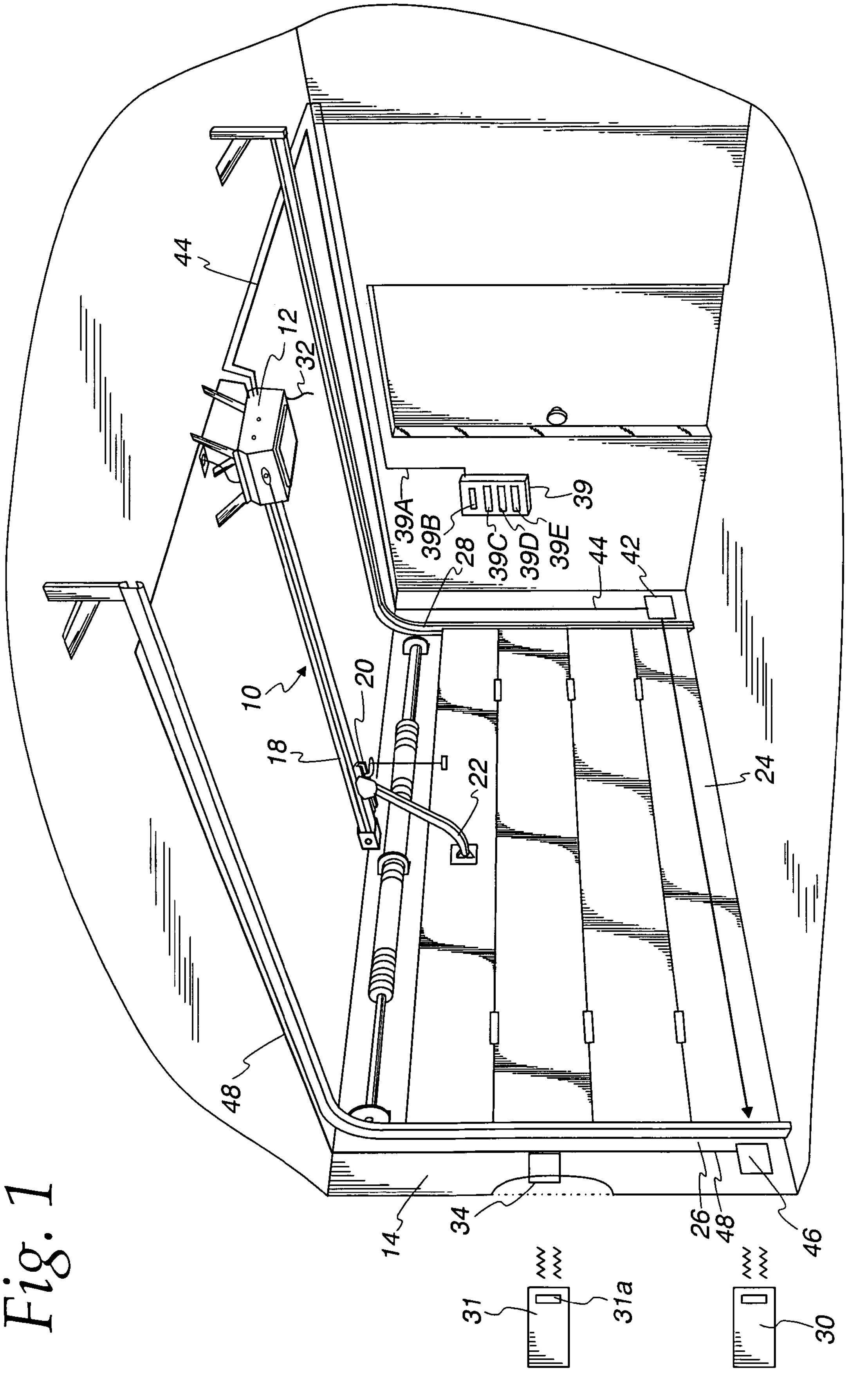
FIG. 1 is a perspective view of a garage having mounted within it a garage door operator in accordance with one embodiment of the invention.

Referring now to FIG. 1, a remote control access or garage door operator system is generally shown therein and referred to by numeral 10 includes a head unit 12 mounted within a garage 14. More specifically, the head unit 12 is mounted to the ceiling of the garage 14 and includes a rail 18 extending therefrom with a releasable trolley 20 attached having an arm 22 extending to a multiple paneled garage door 24 positioned for movement along a pair of door rails 26 and 28.

The system includes a hand-held transmitter unit 31 adapted to respond to a user pressing a push button 31*a* to send signals to an antenna 32 positioned on the head unit 12 and coupled to a receiver as will appear hereinafter. An external control pad 34 is positioned on the outside of the garage 14 having a plurality of buttons thereon and communicates via radio frequency transmission with the antenna 32 of the head unit 12.

As described else where in this application, an additional transmitter unit 30 non-invasively detects the occurrence of an event involving an actuation of at least one component of a motor vehicle (not shown in FIG. 1). For example, the transmitter unit 30 may non-invasively detect the actuation of an automotive light; actuation of a brake; motion of a window; activation of a lock; movement of a mirror; movement of a radio control; movement of a moon roof or sun roof; movement of a windshield wiper blade; actuation of a heater; setting of a cruise control. Then, the transmitter unit 30 transmits a control signal to the head unit 12 as a result of detecting the event.

The transmitter unit 30 may also receive an indication of proximity of the motor vehicle to the remote control access system. In this case, the control signal includes transmitting the control signal upon detection of the event and upon receiving the indication of proximity of the motor vehicle to the remote control access system.

In another approach, the transmitter unit 30 receives an indication from a remote indicator source that a motor vehicle is in proximity to the head unit 12, other components of the remote control access system or the garage 14. The transmitter unit 30 also receives an indication of the occurrence of an event involving actuation of at least one component of a motor vehicle; The indication is communicated to the transmitter unit 30. Upon detection of the proximity of the motor vehicle and the receipt of the indication of the event, a control signal is transmitted from the transmitter unit 30 to the head unit 12.

A switch module 39 is mounted on the wall of the garage. The switch module 39 is connected to the head unit by a pair of wires 39*a*. The switch module 39 includes a learn switch 39*b*, a light switch 39*c*, a lock switch 39*d* and a command switch 39*e*. An optical emitter 42 is connected via a power and signal line 44 to the head unit 12. An optical detector 46 is connected via a wire 48 to the head unit 12. Emitter 42 and detector 46 are used to identify possible obstructions in the doorway.

Figure 2:
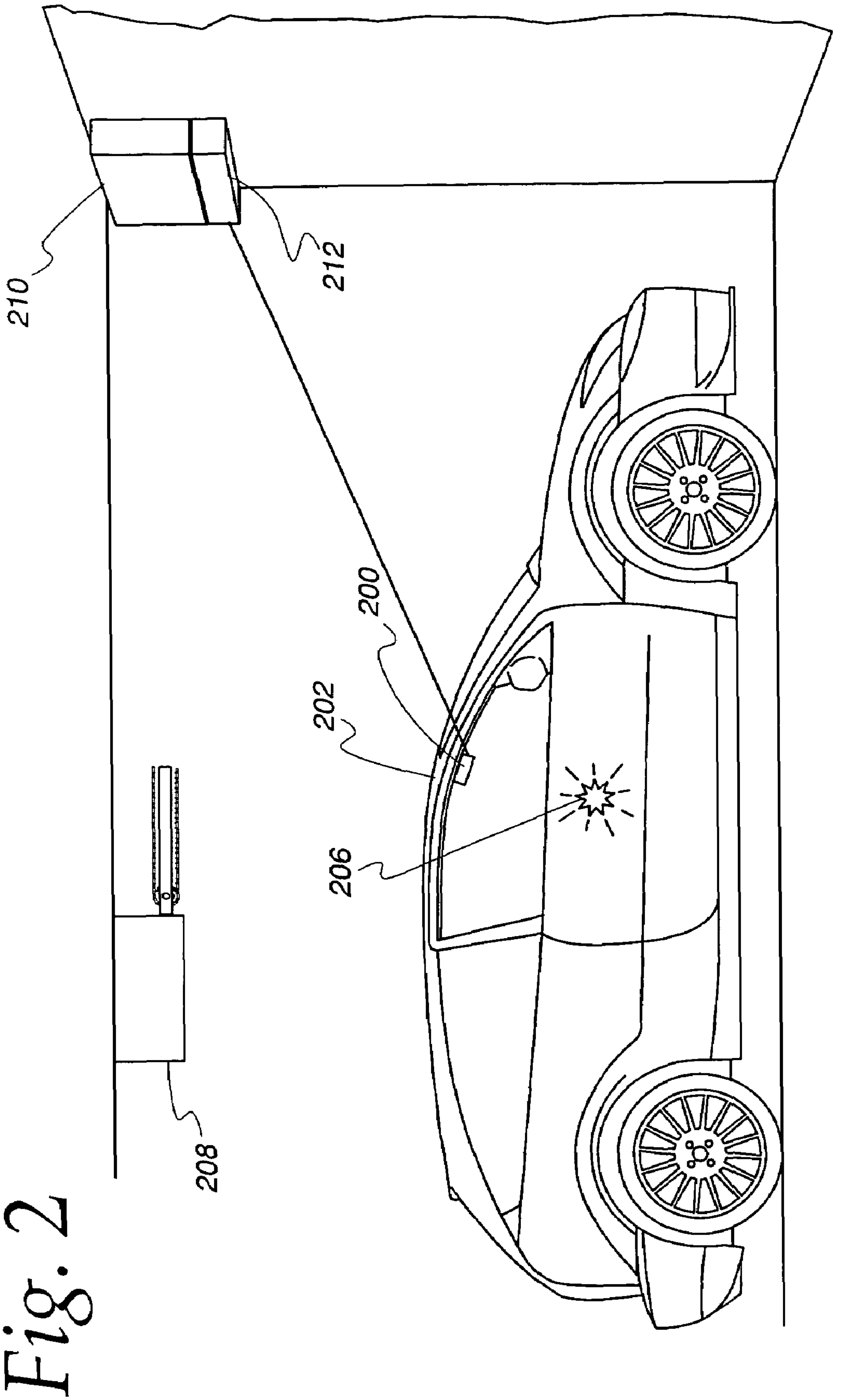
FIG. 2 is a block diagram of a system in accordance with one embodiment of the invention.

Referring now to FIG. 2, a system for transmitting a signal to a remote control access system is described. A transmitter unit 200 within a vehicle 202 non-invasively detects the occurrence of an event 206. The event may be the actuation of a component of the vehicle 202. For example, the transmitter unit 200 may detect the actuation of an automotive light; actuation of a brake; motion of a window; activation of a lock; movement of a mirror; movement of a radio control; movement of a moon roof or sun roof; movement of a windshield wiper blade; actuation of a heater; or setting of a cruise control. Other examples of components that are actuated and events in the vehicle 202 are possible.

In one approach, the transmitter unit 200 is powered by its own battery and may include a sensor that detects energy produced as a result of the occurrence of the event. The transmitter unit 200 detects the event with minimal interference and interaction with the components of the vehicle 202. Specifically, no need exists to interfere with, tap, or modify the internal wiring in the vehicle 202. In other words, little or no modifications to the internal components and systems of the vehicle 202 need be made.

To detect the occurrence of the event in a non-invasive manner, the transmitter 200 may be placed at some convenient location in the vehicle 202 and, therefore, quickly and easily installed. In one example the transmitter unit 200 may be placed on the dashboard of the vehicle 202 to detect the actuation of the windshield wiper blades or the movement of a window of the vehicle 200. In another example, a sensor of the transmitter unit 200 may be attached near the headlight to detect the actuation of the headlight. In still another example, the transmitter unit 200 may be attached to a sun visor of the vehicle 202 to receive a signal indicating the actuation of the headlight.

In another approach, the transmitter unit 200 may be interconnected with the components of the vehicle 202. For example, the transmitter unit 200 may be directly connected to the headlight system of the vehicle 202. When the headlight system of the vehicle 202 is actuated, the signal is detected and communicated to the transmitter unit 200. In this approach, vehicle components and systems may need to be modified by the user.

The transmitter unit 200 may also determine whether it is in proximity to a remote control access system 210. Alternatively, the transmitter unit 200 may receive an indication indicating that the transmitter unit 200 is in proximity to the remote control access system 210. For example, the transmitter unit 200 may receive a signal from a satellite 208 that the transmitter unit 200 is in close proximity to the remote control access system 210. In another example, the transmitter unit 200 detects the presence of a beacon (not shown), which indicates that the transmitter unit 200 is in proximity to the remote control access system 210. In still another example, the transmitter unit 200 may determine its location from a signal received from the satellite 208.

In still another example, a camera can be used to recognize the image of a vehicle, a portion of a vehicle, a license plate, a person or some other recognizable feature and transmits a signal to the transmitter unit 200.

The transmitter unit 200 determines when it will send a signal to the receiver. In one approach, the transmitter unit 200 takes the information non-invasively determined concerning the occurrence of an event and transmits a code to the receiver 212, when it detects the occurrence of the event. The transmitter unit 200 may also non-invasively determine the occurrence an event and whether it is in close proximity to the remote control access system 210. The transmitter unit 200 may then transmit a code to the receiver 212 when it determines both of these conditions are met. In still another example, the transmitter unit 200 may determine the occurrence of an event by direct connection as well as its proximity to the remote control access system, and send a control signal when both conditions occur.

Thus, a method and system is described where a transmitter unit detects the occurrence of an event and responsively actuates the remote control access system. The transmitter unit detects the event in a non-invasive manner and may also use proximity as a further requirement for actuation of the remote control entry system. In addition, a method and system are described where the event is detected invasively and proximity of the transmitter unit to the remote control entry system is determined to generate the code word to actuate the remote control access system Referring now to FIG. 3, one example of a transmitter unit 300 within a vehicle 301 is described. The vehicle 301 may be any type of vehicle, motorized or non-motorized, that carries humans. In a preferred approach, the vehicle is an automobile. The vehicle 301 includes a variety of components (not shown) such as windows, headlights, turning-signals, turning lights, a moon roof or sun roof, locks, windshield wipers, as well as the controls used to actuate these components.

An event, represented by numeral 302, produces energy 304. The event may be the actuation of a component of the vehicle 301. For example, the event may be the actuation of an automotive light, the actuation of a brake, the motion of a window, the activation of a lock, the movement of a mirror, the movement of a radio control, the movement of a moon roof or sun roof; the movement of a windshield wiper blade; the actuation of a heater; or the setting of a cruise control Other components of the vehicle 301 may also be actuated. The energy 304 may be electromagnetic energy, sonic energy, or any other form of energy.

The energy 304 is detected by the sensor 306 of the transmitter unit 300. The sensor 306 of the transmitter unit 300 detects the energy 304 in a non-invasive way with respect to the components of the vehicle 301. In one example, the sensor 306 may be of the type that receives and detects electromagnetic radiation. In another example, the sensor 306 may be of the type that detects sonic energy. In still another example, the sensor 306 may detect multiple types of energy 304.

Figure 3:
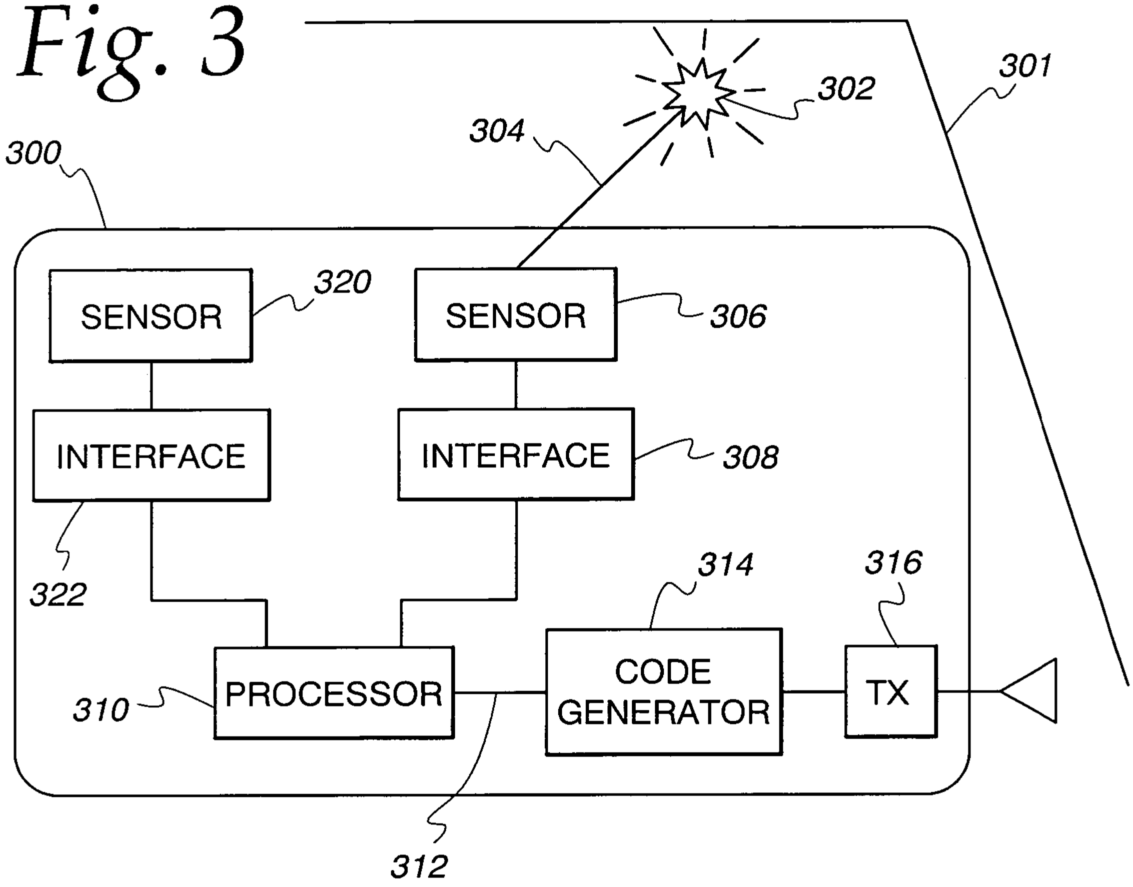
FIG. 3 is a block diagram of a transmitter unit in accordance with one embodiment of the invention.

As shown in FIG. 3, the sensor 306 is in close proximity to the energy occurrence 302 so that it can easily detect the event 302. In addition, the sensor 306 is shown as being in close proximity to the transmitter unit 300. However, it will realized that the sensor 306 may be placed anywhere in the vehicle and coupled to the transmitter unit 300 by any method or medium, as long as the positioning of the sensor 306 is easily accomplished and the coupling is non-invasive with respect to the components of the vehicle 301. In one example, the sensor 306 may be placed near the window of the vehicle 301 and coupled to transmitter unit 300 using a wire.

The received energy 304 is detected by the sensor 306 and passed to an interface 308. The interface 308 converts the energy 304 from its produced original form to a form usable by a processor 310. In a preferred approach, the interface 308 converts the energy 304 that is visible electromagnetic radiation into digital signals that are processed by the processor 310.

While the energy 304 is preferably converted into binary values, the interface 308 may also convert the energy 304 from electromagnetic radiation into other forms usable by the processor 310, for example into an analog electric current. Other types of conversions may also be possible.

A proximity sensor 320 receives a signal that indicates or may be processed to indicate that the transmitter unit 300 is in close proximity to a remote control access system. The signal received by the sensor 306 may, for example, be from a satellite or from another source. The signal is sent to the interface 322, where the signal is converted into a form that is usable by the processor 310.

The processor 310 receives the information from the interface 308 and interface 322. The processor 310 determines whether, based upon the information provided, the processor 310 should initiate the transmission of a transmission signal 312 to a code generator 314.

The processor 310 generates a transmission signal 312 if an event is detected. For example, if a requirement exists that the actuation of headlights of the vehicle indicates an event, then the processor 310 determines whether the information received from the interface 308 indicates whether the headlight have been actuated.

Other events also may be used to trigger a transmission signal 312. The processor 310 may determine whether a window has been opened or closed by comparing the received information from the interface 308 to an audio pattern stored in a memory to determine whether the pattern has been detected.

Instead of using only the detection of an event as a trigger, the processor 310 may generate the transmission signal 312 if proximity to the remote control access system has been detected and an event has been detected. In this case, the processor 310 determines whether it is within a certain distance, for example, a certain number of feet, from the remote control access system.

The code generator 314 forms a code in response to receipt of the transmission signal 312. The code may be a preset, fixed code programed into the code generator 314 when the transmitter unit 300 is manufactured. In another approach, the code generator may produce a rolling code. Rolling codes which change with each actuation of the transmitter unit 300 may be used in the present system in the same or similar manner as discussed in U.S. Pat. No. 5,872,513, which is incorporated by reference in its entirety. The coded signal is then transmitted to the remote control entry system. The code is transmitted by a transmitter 316, which may be any type of transmitter as is known in the art.

Figure 4:
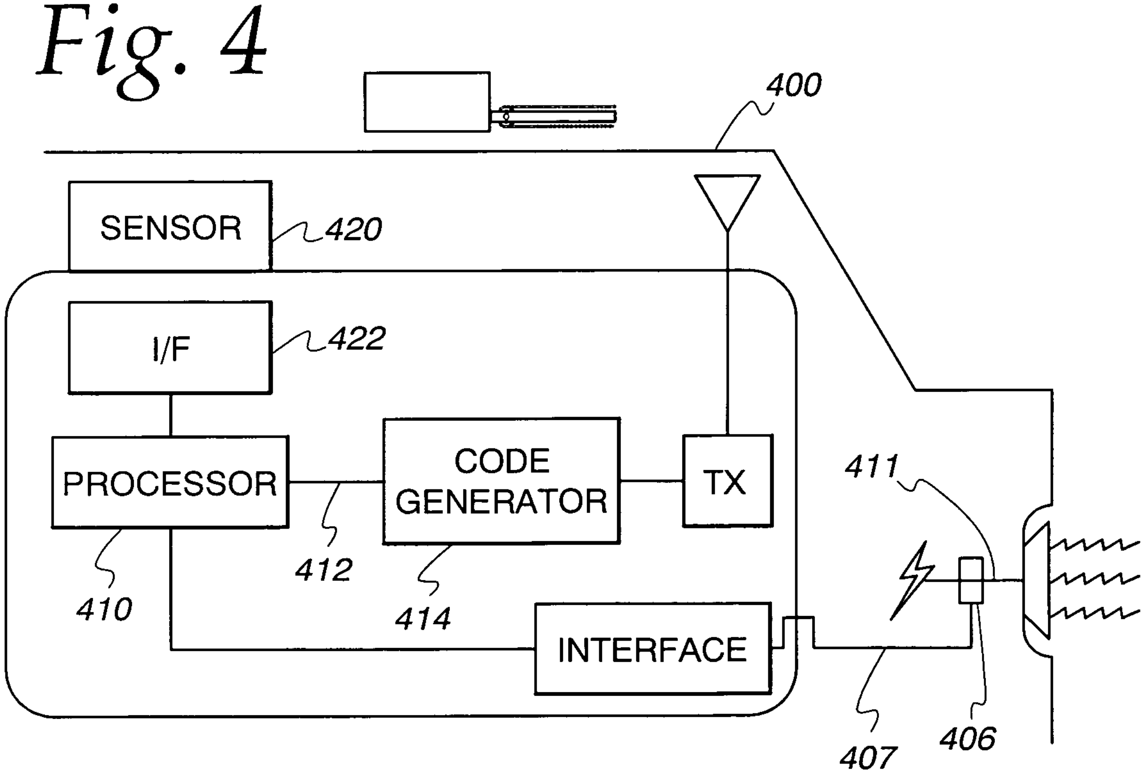
FIG. 4 is a block diagram of a transmitter unit and event detector in accordance with one embodiment of the invention.

Referring now to FIG. 4, another example of a transmitter unit 400 within a vehicle 401 is described. The vehicle 401 may be any type of vehicle, motorized or non-motorized, that carries humans. In a preferred approach, the vehicle is an automobile. The vehicle 401 includes a variety of components (not shown) such as windows, headlights, turning-signals, turning lights, a moon roof or sun roof, locks, windshield wipers, as well as the controls used to actuate these components.

An event, in this case the actuation of a headlight 402, is made via a headlight electrical connection 411 supplying electrical current from a battery (not shown) of the vehicle 401. In other examples, the event may be the actuation of other components of the vehicle and the detection made by detecting other signals within the vehicle 401. For example, the event may be the actuation of a brake, the motion of a window, the activation of a lock, the movement of a mirror, the movement of a radio control, the movement of a moon roof or sun roof; the movement of a windshield wiper blade; the actuation of a heater; or the setting of a cruise control.

As shown in FIG. 4, a sensor 406 is shown interconnected to the electrical system of the vehicle 400 and, specifically, to the headlight wiring 411. The sensor 406 detects the electrical signal in the connection 411 and communicates this to an interface 408.

A proximity sensor 420 receives a signal that indicates or may be processed to indicate that the transmitter unit 400 is in close proximity to a remote control access system. The signal received by the sensor may, for example, be from a satellite 413 or from another source. The signal is sent to an interface 422, where the signal is converted into a form that is usable by the processor 410.

The processor 410 receives the information from the interfaces 408 and 422. The processor 410 determines whether, based upon the information provided, the processor 410 should initiate the transmission of a transmission signal 412 to a code generator 414. In this example, a transmission signal will be generated if an event has been detected and proximity to the remote control access system has also been detected.

The code generator 414 forms a code in response to receipt of the transmission signal 412. The code may be a preset, fixed code programed into the code generator 414 when the transmitter unit 400 is manufactured. In another approach, the code generator may produce a rolling code. The coded signal is then sent to the remote control access system.

Figure 5A:
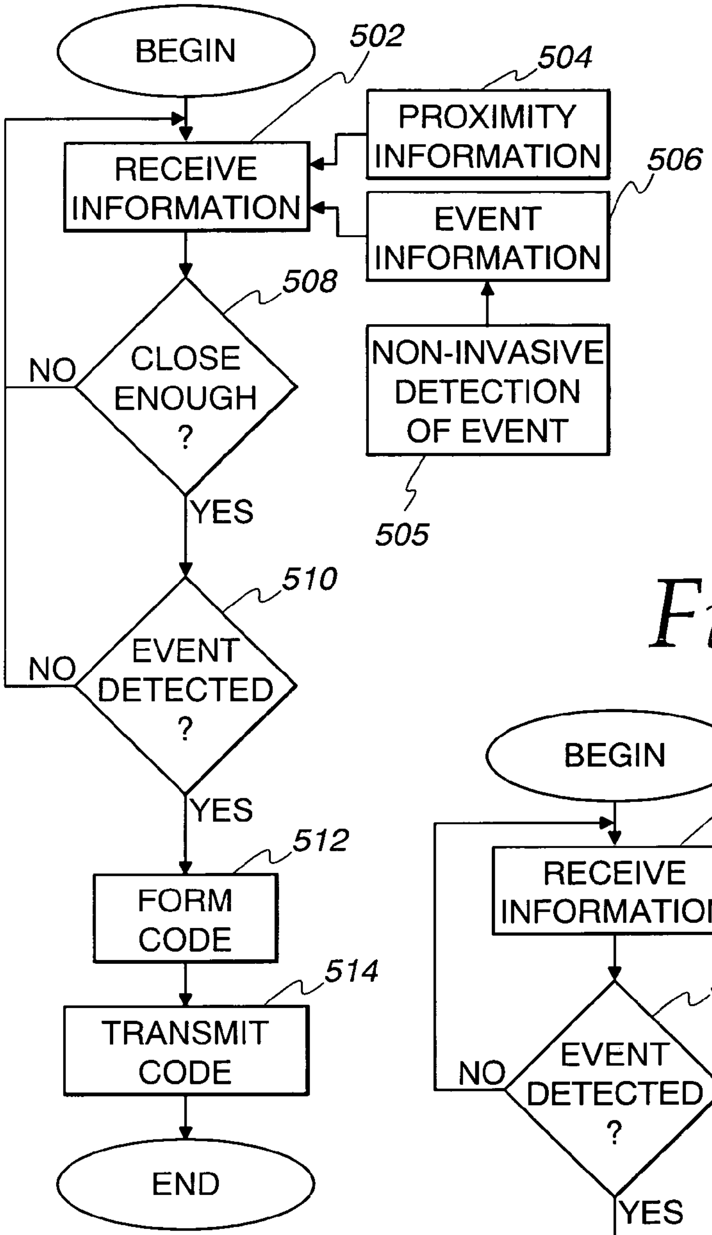
FIG. 5A is a flow chart of the operation of a system in accordance with one embodiment of the invention.

Referring now to FIG. 5A, one example of the operation of a transmitter unit is described. At step 502, the transmitter unit receives information. The information may be proximity information 504 or event information 506. The proximity information indicates whether the transmitter unit is in proximity to a remote control entry system. Alternatively, the information may be used by the processor so that the degree of proximity to the remote control access system can be determined.

The event information 506 may include information indicating the occurrence of an event involving a vehicle component, for example, the detection of energy from the actuation of an automotive light, the actuation of a brake, the motion of a window, the activation of a lock, the movement of a mirror, the movement of a radio control, the movement of a moon roof or sun roof; the movement of a windshield wiper blade; the actuation of a heater; or the setting of a cruise control.

The event information 506 is detected non-invasively at step 505. In other words, the non-invasive detection is accomplished with minimal interference and interaction with the components of the vehicle.

At step 508, the transmitter unit determines from the proximity information directly or indirectly whether the transmitter unit is within a pre-determined distance of the remote control access system, for example, by comparing the received or calculated value to a predetermined threshold value. If the comparison 508 indicates that the transmitter unit is not within range, control returns to step 502. If the value is within range, then execution continues at step 510. At step 510, the transmitter unit determines whether an event is detected. This, for example, may mean determining if an electromagnetic signal indicates that the headlights were activated or detecting a sonic signal to indicate that a window was opened. If the answer is negative, control returns step 502. If the answer is affirmative, control continues to step 512.

At step 512, a code is formed. The code may either be a rolling or predetermined code. At step 514, the code is transmitted to the remote control entry system, which is actuated upon receipt of the code.

Figure 5B:
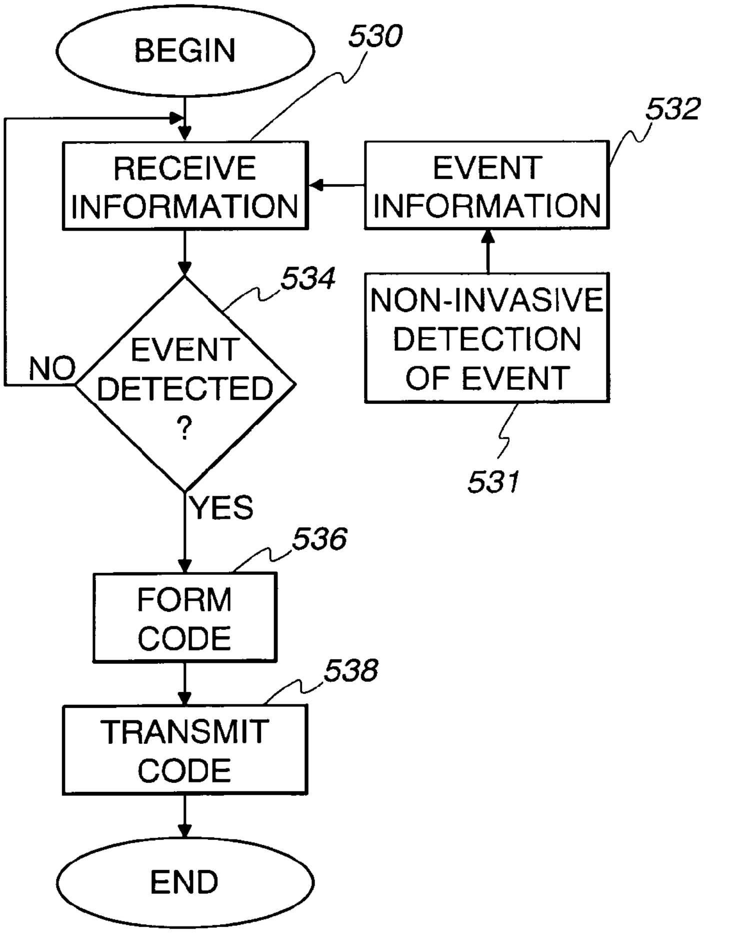
FIG. 5B is a flow chart of the operation of a system in accordance with one embodiment of the invention Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

Referring now to FIG. 5B, another example of the operation of a transmitter unit is described. At step 530, the transmitter unit receives information indicating the occurrence event involving a vehicle component. The information is event information 532. The event information may include information indicating, for example, the detection of energy from the actuation of an automotive light, the actuation of a brake, the motion of a window, the activation of a lock, the movement of a mirror, the movement of a radio control, the movement of a moon roof or sun roof; the movement of a windshield wiper blade; the actuation of a heater; or the setting of a cruise control.

The event information 532 is detected non-invasively at step 531. In other words, the non-invasive detection is accomplished with minimal interference and interaction with the components of the vehicle.

At step 534, the transmitter unit determines whether an event has, in fact, occurred. This, for example, may mean determining if an electromagnetic signal indicates that the headlights were activated or detecting a sonic signal to indicate that a window was opened. If the answer is negative, control continues at step 530. If the answer is affirmative, control continues at step 536.

At step 536, a code is formed. For example, a fixed code may be formed. In another example, a rolling code may be formed. At step 538, the code is transmitted to the remote control entry system, which is actuated upon receipt and confirmation of the code.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A method for actuating a remote control access system comprising:
- receiving an indication from a remote indicator source that a motor vehicle is in proximity to the remote control access system;
- receiving an indication of an actuation of one or more components of the motor vehicle from a detection circuit directly detecting the actuation of the one or more components;
- communicating the indication the actuation of the one or more components of the motor vehicle and the indication from the remote indicator source that the motor vehicle is in proximity to the remote control access system to a transmitter unit; and
- upon detection of the proximity of the motor vehicle and the receipt of the indication of the actuation, transmitting a control signal from the transmitter unit to the remote control access system.

2. The method of claim 1 wherein communicating the indication of the occurrence of the event to the transmitter unit includes transmitting the indication using a wire.

3. The method of claim 1 wherein communicating the indication includes transmitting an electromagnetic signal over the air.

4. The method of claim 1 wherein detecting the indication includes detecting the occurrence of at least one of electromagnetic energy from the actuation of an automotive light, the actuation of a brake, the motion of a window, the activation of a lock, the movement of a mirror, the movement of a radio control, the movement of a roof opening; the movement of a windshield wiper blade; the actuation of a heater; or the setting of a cruise control.

5. A device for actuating a remote control access system comprising:
- a detection circuit for sensing the actuation of one or more component of a motor vehicle;

a proximity detection circuit for detecting whether the motor vehicle is in proximity to the remote access system;

a transmitter circuit coupled to the detection circuit and the proximity detection circuit;

such that the transmitter circuit sends a control signal upon the sensed actuation and the indication that the motor vehicle is in proximity to the remote control access system.

6. The device of claim 5 wherein the detection circuit is coupled to the transmitter circuit with a wire.

7. The device of claim 5 wherein the detection circuit is coupled to the transmitter circuit via an air interface.

8. The device of claim 5 wherein the detection circuit senses one of electromagnetic energy from the actuation of an automotive light; the actuation of a brake; the motion of a window; the activation of a lock; the movement of a mirror; the movement of a radio control; the movement of a roof opening; the movement of a windshield wiper blade; the actuation of a heater; or the setting of a cruise control.

* * * * *

UNITED STATES PATENT AND TRADEMARK OFFICE

CERTIFICATE OF CORRECTION

PATENT NO. : 7,477,147 B2
APPLICATION NO. : 11/542285
DATED : January 13, 2009
INVENTOR(S) : James J. Fitzgibbon It is certified that error appears in the above-identified patent and that said Letters Patent is hereby corrected as shown below:

Claim 1, Column 8, Line 41; After "indication" insert -- of --; and

Claim 5, Column 8, Line 66; After "for" insert -- directly --.

Signed and Sealed this

Twentieth Day of October, 2009

David J. Kappos
*Director of the United States Patent and Trademark Office*